United States Patent
Safier et al.

(10) Patent No.: US 9,407,467 B2
(45) Date of Patent: Aug. 2, 2016

(54) METHOD AND APPARATUS FOR TRANSMITTING AND RECEIVING INFORMATION WIRELESSLY USING INTENSITY INTERFEROMETRY

(71) Applicants: Pedro N. Safier, Alexandria, VA (US); Ira S. Moskowitz, Washington, DC (US); Gerard Allwein, Washington, DC (US)

(72) Inventors: Pedro N. Safier, Alexandria, VA (US); Ira S. Moskowitz, Washington, DC (US); Gerard Allwein, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/521,988

(22) Filed: Oct. 23, 2014

(65) Prior Publication Data

US 2015/0110206 A1    Apr. 23, 2015

Related U.S. Application Data

(60) Provisional application No. 61/894,558, filed on Oct. 23, 2013.

(51) Int. Cl.
*H04L 25/02* (2006.01)
*H04L 12/18* (2006.01)
*H04L 25/14* (2006.01)

(52) U.S. Cl.
CPC ............... *H04L 25/02* (2013.01); *H04L 25/14* (2013.01)

(58) Field of Classification Search
CPC ..... G01S 1/302; G01S 13/9023; G01S 19/43; G01S 19/54; H04L 12/189; H04L 25/14
See application file for complete search history.

(56) References Cited

U.S. PATENT DOCUMENTS

| | | | | |
|---|---|---|---|---|
| 3,134,840 A | * | 5/1964 | Gamo | G01J 9/02 356/491 |
| 6,557,103 B1 | * | 4/2003 | Boncelet, Jr. | H04K 1/00 380/208 |
| 2003/0162519 A1 | * | 8/2003 | Smith et al. | 455/277.1 |
| 2005/0009473 A1 | * | 1/2005 | Ranta et al. | 455/83 |
| 2012/0157148 A1 | * | 6/2012 | Baker | 455/517 |

(Continued)

OTHER PUBLICATIONS

R. Hanbury Brown, J. Davis, and L. R Allen. "The angular diameters of 32 stars." Monthly Notices of the Royal Astronomical Society, vol. 167, pp. 121-136 (Jan. 1974).

(Continued)

*Primary Examiner* — Aristocratis Fotakis
(74) *Attorney, Agent, or Firm* — US Naval Research Laboratory; Richard F. Bis

(57) ABSTRACT

As system and method to transmit information with intensity interferometry includes a digital switch configured to receive a baseline message, and, for each of a plurality of bits of a received interferometric message, set the digital switch to an output position depending upon the bit value of the interferometric message. A first and second pair of transmitters separated by a first and second defined distance, wherein the defined distances are different, are configured to broadcast each of the plurality of bits of the baseline message depending upon the output position of the digital switch. One or more pairs of receivers are configured to receive the broadcast of the plurality of bits of the baseline message. An interferometric message recovery module is configured to recover the bits of the received interferometric message after receiving the broadcast of the baseline message at the one or more pairs of receivers.

15 Claims, 5 Drawing Sheets

(56) References Cited

U.S. PATENT DOCUMENTS

| | | | | |
|---|---|---|---|---|
| 2012/0232842 | A1* | 9/2012 | Altwaijry | G02B 23/00 702/179 |
| 2012/0275531 | A1* | 11/2012 | Wu et al. | 375/267 |
| 2013/0101059 | A1* | 4/2013 | Moskowitz | H04N 1/32144 375/259 |
| 2014/0003558 | A1* | 1/2014 | Ichikawa | 375/343 |

OTHER PUBLICATIONS

P.R. Fontana. "Multidetector intensity interferometers." Journal of applied physics, vol. 54, No. 2, pp. 473-480 (Jan. 1983).

G. Baym. "The physics of hanbury brown-twiss intensity interferometry: From stars to nuclear collisions," Acta Physica Polonica, Series B, 29(7):1839-1884 (Jan. 1998).

I. Emre Telatar. "Capacity of multi-antenna Gaussian channels," European Transactions on Telecommunications, 10(6):585-596, (Jan. 1999).

G. J. Foschini and M. J. Gans. "On limits of wireless communications in a fading environment when using multiple antennas," Wireless Personal Communications, 6:311-335 (Jan. 1998).

S.W. Golomb. "The limiting behavior of the Z-channel," IEEE Transactions on Information Theory, 66(3):372 (May 1980).

L.G. Tallini, S. Al-Bassam, and B. Bose. "On the capacity and codes for the z-channel," 2002 Proceedings for IEEE International Symposium on Information Theory, p. 422 (Jun. 2002).

David Culler, Deborah Estrin, and Mani Srivastava. "Guest editors' introduction: Overview of sensor networks," Computer, 37(8):41-49 (Aug. 2004).

A. Perrig, J. Stankovic, and D. Wagner. "Security in wireless sensor networks," Communications of the ACM, 47(6):53-57 (Jun. 2004).

H. Chan and A. Perrig. "Security and privacy in sensor networks," Computer, 36(10):103-105 (Oct. 2003).

H. Chan, A. Perrig, and D. Song. "Random key predistribution schemes for sensor networks," Proceedings for 2003 Symposium Security and Privacy, pp. 197-213 (May 2003).

\* cited by examiner

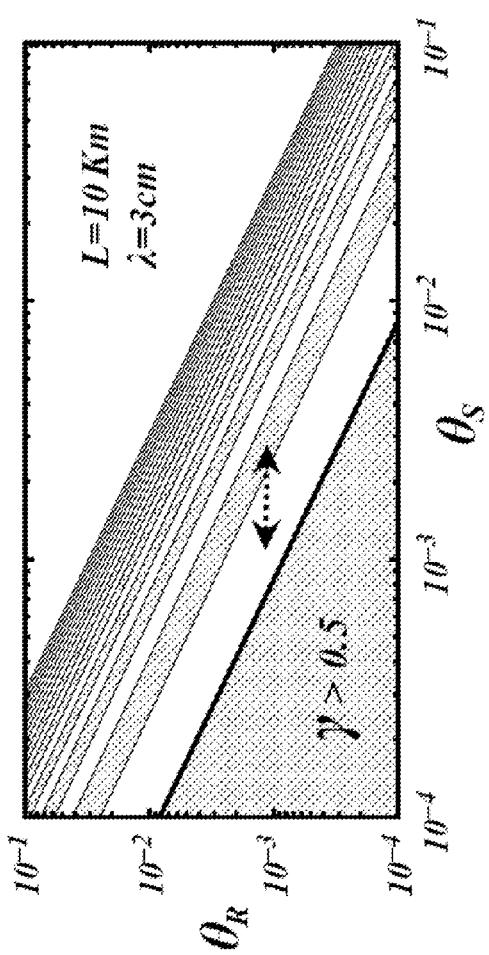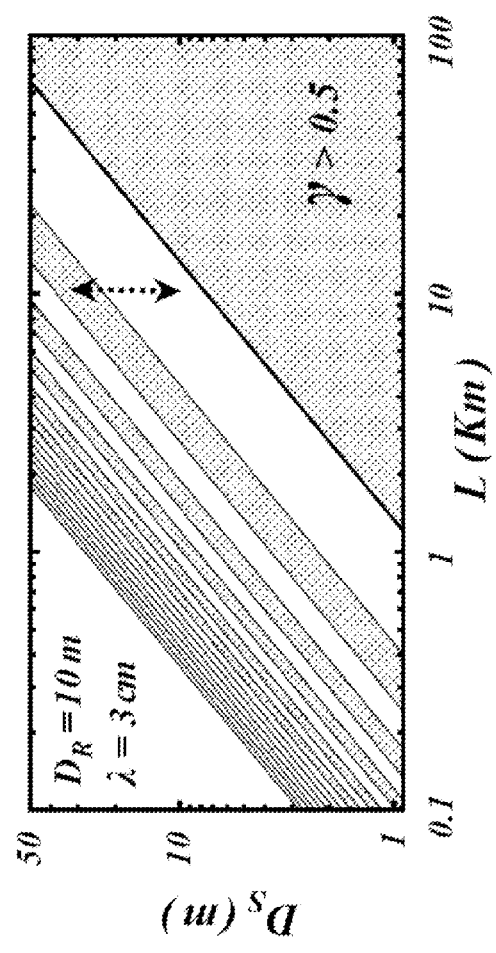
Figure 5(a)
Figure 5(b)

METHOD AND APPARATUS FOR TRANSMITTING AND RECEIVING INFORMATION WIRELESSLY USING INTENSITY INTERFEROMETRY

CROSS-REFERENCE TO RELATED APPLICATIONS

This application claims priority to provisional patent application entitled, "Capacity of an Intensity Interferometry Channel," filed on Oct. 23, 2013, and assigned U.S. Application No. 61/894,558; the entire contents of which are hereby incorporated by reference.

FIELD OF THE INVENTION

The present disclosure relates generally to a communication channel, and more specifically relates to creating a communication channel to transmit information wirelessly utilizing intensity interferometry.

BACKGROUND

Classical long-distance communication methods are based on the emission and detection of electromagnetic fields (EM fields). Typically, current methods are based upon the modulation of the amplitude, phase, and frequency of these fields. Because EM fields are composed of photons, these fields have additional characteristics that have not been exploited to communicate. One of these characteristics is the spatial and time correlations that exist between photons because of their quantum-mechanical nature.

For many years, the spatial correlations between photons have been exploited in science and technology through the use of a technique called intensity interferometry; for example, to measure stellar angular diameters; to investigate nuclear collisions; to measure electron temperature fluctuations in fusion plasmas; and head-disk spacing in hard drives; to characterize hard synchrotron radiation; as a diagnostic tool in Biology and Chemistry; and recently to investigate the quantum state of Bose-Einstein condensates. In short, up to now, non-local spatial correlations between photons have been used through intensity interferometry as a measurement technique.

FIG. 1 is a diagram 100 demonstrating intensity interferometry, in accordance with an exemplary embodiment of the invention. In FIG. 1, there are two distant random point sources of electromagnetic radiation, i.e., transmitters a 115 and b 120, and there are two independent detectors, i.e., receivers 1 125 and 2 130, at a distance, $D_R$, from each other. The distance between the transmitters and receivers is L. The wavy lines represent different propagation paths for the emitted photons. The detectors need not be directly connected (all field intensity calculations between the two detectors can be done remotely).

Assume that the transmitter sources 115 and 120 are separated in space by $D_S$, the two receivers 125 and 130 by $D_R$, and that the distance from the transmitter sources to the receivers, L, is much larger than $D_S$ and $D_R$. Without loss of generality, assume that the radiation pattern is isotropic, and write explicitly the time dependence of the electric field radiated by each antenna, $E_\alpha$, thus $$E_\alpha = A_\alpha \exp(-i\omega_\alpha t + i\phi_\alpha(t)), \quad (1)$$

where the subscript identifies the transmitter antenna ($\alpha = a, b$) and $A_\alpha$ is the amplitude.

On the receiving end, the second order correlation function is defined by $$C \triangleq \frac{\langle I_1 I_2 \rangle}{\langle I_1 \rangle \langle I_2 \rangle} \quad (2)$$

where $I_j$ is the EM field intensity at receiver j, $I_j = E_j E_j^*$ (the asterisk denotes complex conjugation) and $E_j$ is the total electric field at detector j from both sources. The sharp brackets indicate a time average over time interval $T_0$. To simplify the discussion, assume that the emission from both sources is at the same frequency $\omega_a = \omega_b = \omega$ and that both sources emit radiation with the same amplitude, $A_a = A_b = A$. Furthermore, assume that $\phi_a(t)$ and $\phi_b(t)$ are statistically independent random variables. Then calculate the time averages over a time $T_0$ much larger than the coherence time $T_C$ of the sources, i.e., the time over which $\phi_\alpha(t)$ is constant, then the factors that depend on $$\delta(t) \triangleq \Phi_a(t) - \Phi_b(t) \quad (3)$$

become vanishingly small and may be ignored. Thus, in the far-field region, i.e., $D_S, D_R \ll L$, and with the above assumptions, the second-order correlation function in eq. (2) is given by $$C \approx 1 + \cos^2(\Delta) \quad (4)$$

where $\lambda$ is the radiation's wavelength and $$\Delta \triangleq \frac{\pi D_S D_R}{L\lambda} \quad (5)$$

One of ordinary skill in the art will recognize that equation (4) is the basis of Hanbury Brown and Twiss interferometry. One of ordinary skill in the art will understand that the term "Hanbury Brown and Twiss interferometry" is most widely used in astronomy. Accordingly, herein the term "intensity interferometry" will be used. The basis of intensity interferometry is that the linear size of the source, $D_S$, is fixed but unknown, and the experimenter varies the distance between the receivers $D_R$, records the intensities, and calculates the second-order spatial correlation. It is possible to find the angular size $\theta_S = D_S / L$ of the source by plotting as a function of $D_R$ the reduced second-order correlation, $\gamma$, $$\gamma \triangleq \frac{C - 1}{C(0) - 1} \quad (6)$$

where $C(0)$ is the value of C extrapolated to $D_R = 0$. Using equation (4) one can obtain $$\gamma = \cos^2(\Delta). \quad (7)$$

The value of $D_R$ where $\gamma$ first vanishes corresponds to the angular size of the source, $\theta_S$.

One of ordinary skill in the art will recognize that this is the method that Hanbury Brown and Twiss used to measure the angular size of stellar sources both at radio and optical wavelengths. In their scenario, $T_0 \gg T_C$ because the stellar radiation is incoherent on time scales much smaller than the integration time necessary to achieve a good signal to noise ratio.

In the prior art, intensity interferometry has been used to measure the angular size of the source $\theta_S = D_S/L$ by varying the distance between receivers $D_R$. Note that according to equation (4) the second-order correlation C is unchanged upon permutation of $D_S$ and $D_R$.

Accordingly, there remains a need to exploit the symmetry in intensity interferometry to create a communication channel to transmit information wirelessly.

SUMMARY OF THE INVENTION

According to one aspect of the invention, a system is described for an interferometric communication channel that includes a digital switch that can be configured to receive a baseline message, and, for each of a plurality of bits of a received interferometric message, set the digital switch to an output position depending upon the bit value of the interferometric message. A first and second pair of transmitters separated by a first and second defined distance, wherein the defined distances are different, can be configured to broadcast each of the plurality of bits of the baseline message depending upon the output position of the digital switch. One or more pairs of receivers can be configured to receive the broadcast of the plurality of bits of the baseline message. An interferometric message recovery module can be configured to recover the bits of the received interferometric message after receiving the broadcast of the baseline message at the one or more pairs of receivers.

According to another aspect of the invention, a method is described for transmitting information with intensity interferometry by feeding a baseline message to a digital switch, wherein the baseline message comprises a plurality of bits. For each of a plurality of bits of a received interferometric message, the digital switch can be set to an output position depending upon the bit value of the interferometric message. Each of the plurality of bits of the baseline message can be broadcast through a first pair of transmitters and a second pair of transmitters depending upon the output position of the digital switch. The broadcast of the plurality of bits of the baseline message can be received at one or more pairs of receivers. Finally, the received interferometric message can be recovered after receiving the broadcast of the plurality of bits of the baseline message at the one or more pairs of receivers.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 5($a$) and FIG. 5($b$) are contour plots of $\gamma$ depending on $D_S$, $D_R$, and L, in accordance with an exemplary embodiment of the invention.

DETAILED DESCRIPTION OF EXEMPLARY EMBODIMENTS

Figure 1:
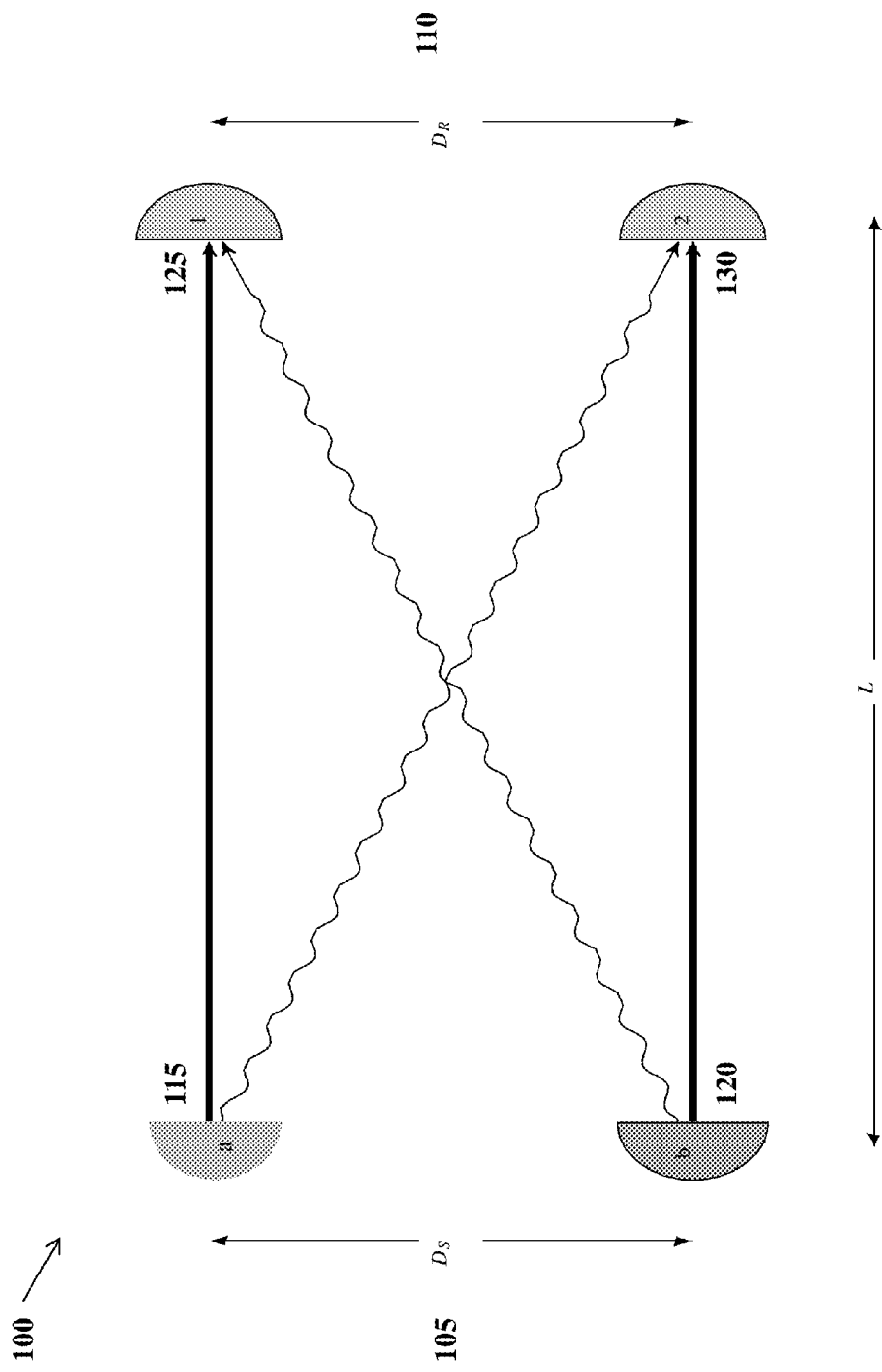
FIG. 1 is a diagram demonstrating intensity interferometry, in accordance with an exemplary embodiment of the invention.

One or more embodiments or implementations are hereinafter described in conjunction with the drawings, where like reference numerals refer to like elements throughout, and where the various features are not necessarily drawn to scale.

A novel type of wireless communication channel based on intensity interferometry is described herein. Intensity interferometry is a technique that exploits the non-local spatial correlations between photons, and it is utilized in the invention as a wireless transmission method, wherein a wireless channel has the characteristic of a Z-channel and has non-zero capacity. The techniques described herein may be used to send additional low-priority data through an existing data link suitably modified to support intensity interferometry, or to send data steganographically. Furthermore, the use of intensity interferometry may be relevant for secure communications in wireless sensor networks.

Returning to FIG. 1, which is the diagram 100 demonstrating intensity interferometry, the invention relies on a transmitter side 105 and a receiver side 110. Multiple transmitters, i.e., radiation sources, represented as two transmitters, a 115 and b 120, in FIG. 1, can be separated by a distance Ds. Multiple receivers, represented as two receivers, 1 125 and 2 130, in FIG. 1 can be separated at a distance $D_R$ from each other. The distance between the transmitters and receivers is L. The wavy lines in FIG. 1 represent different propagation paths for emitted photons. No additional transmission is needed, as normal transmission is sufficient.

The transmitter and the receiver are part of a pre-existing link at radio frequencies. This link can be referred to as the baseline link, and the messages thus sent can be referred to as the baseline messages. Herein, the messages sent in accordance with an exemplary embodiment of the invention are referred to as the interferometric message. In the pre-existing link, there can be at least one transmitting antenna and at least one receiving antenna.

Figure 2:
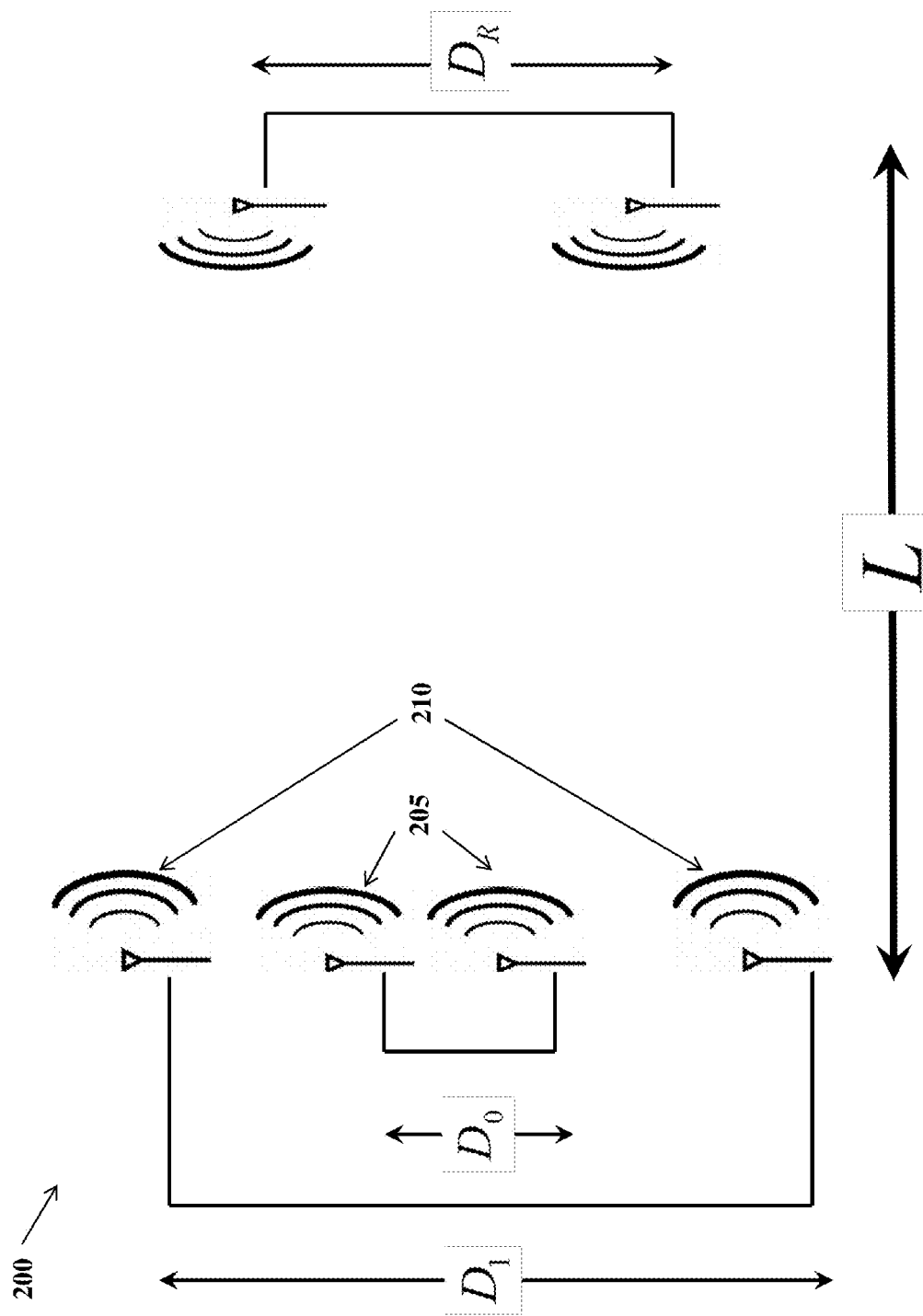
FIG. 2 is a diagram of an antenna layout, in accordance with an exemplary embodiment of the invention.

FIG. 2 is a diagram 200 of the antenna layout, in accordance with an exemplary embodiment of the invention. In an exemplary embodiment of the invention, the layout of the antennas can include replacing each transmitting antenna, or transmitter, by multiple pairs of transmitters along the same baseline, and replacing each receiver by one or more pairs of receivers. In FIG. 2, the two pairs of transmitters can include an inner pair 205, or first pair of transmitters, separated by a distance $D_0$, and an outer pair 210, or second pair of transmitters, separated by a distance $D_1$. The distance $D_0$ does not equal the distance $D_1$. The antennas in each pair can be connected to each other to transmit as a unit.

One of ordinary skill in the art will understand that more pairs of transmitting antennas can be utilized. For example, the total number of transmitters could even be an odd number, but the baseline message is transmitted only through a pair of antennas at a time. That is, if the system had three transmitters, there could be a total of 3 pairs of antennas (i.e., first and second antennas; first and third antennas; and second and third antennas). In this configuration, the distances between each antenna pair will be different (i.e., $D_0 \neq D_1 \neq D_2$). This configuration can allow more than just zeros and ones could be transmitted. For example, values of zero, one, and two could be transmitted, and each value could be sent through a different pair of transmitters.

Figure 3:
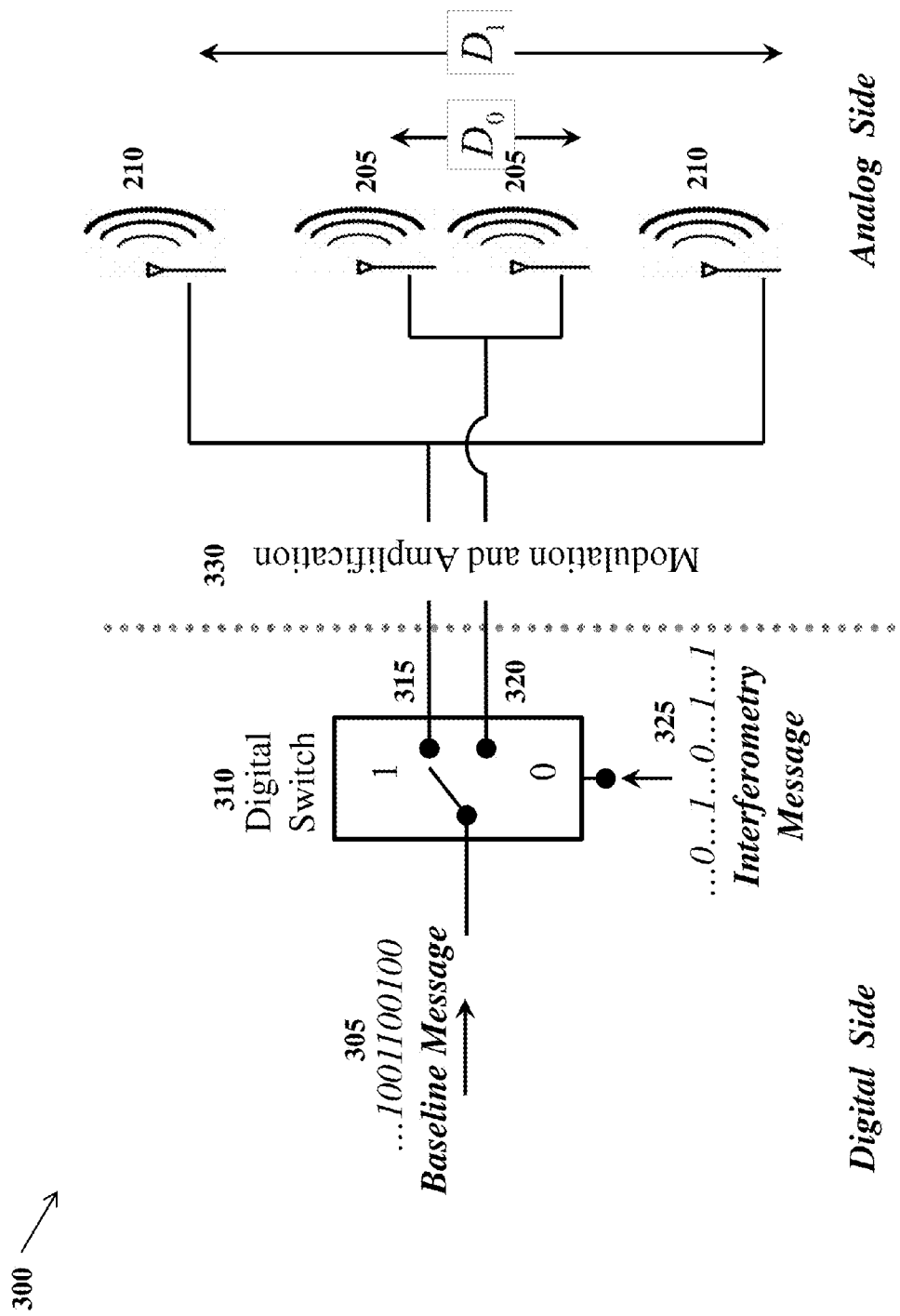
FIG. 3 is a diagram of a transmitter operation, in accordance with an exemplary embodiment of the invention.

FIG. 3 is a diagram 300 of the transmitter operation, in accordance with an exemplary embodiment of the invention. The baseline message, which can be a message or data sent through an existing data link, in digital form 305 can be fed to a standard two-pole digital switch 310. That is, the digital switch can receive the baseline message from a user that is attempting to transmit the baseline message. The time duration of a bit in the baseline message is $T_B$. The digital switch 310 can have at least two output positions: position 1 315 and position 0 320. The state of the digital switch 310 can be controlled by the bit value of an interferometric message 325. These bits must have a time duration $T_0 \gg T_B$. One of ordinary skill in the art will understand that a digital switch with more than two output positions could also be utilized (e.g., an additional output position representing the value of 2).

In an exemplary embodiment of the invention, an interferometric message 325 (e.g., a secure communication that can be sent steganographically that piggybacks on the baseline message, i.e., the baseline message acts as a cover message in terms of steganography) can be used to decide how to send the baseline message data through the communication channel. For example, a user who is transmitting the baseline message can also transmit, or feed, the interferometric message to the interferometric communication channel system, which can receive the interferometric message and use the baseline message as a cover for steganography. For each bit of the interferometric message 325, if the interferometric bit has a value of 0, the switch can be set to position 0 320 for a time $T_0$. Alternatively, for each bit of the interferometric message 325, if the interferometric bit has a value of 1, the switch can be set to position 1 315 for a time $T_0$. One of ordinary skill in the art will understand that the opposite setting can occur as well (i.e., if the interferometric bit has a value of 0, the switch can be set to position 1 315 and if the interferometric bit has a value of 1, the switch can be set to position 0 3320). The output of the switch can be modulated and amplified 330 as in the pre-existing link, utilizing a modulator and amplifier as known to one of ordinary skill in the art.

After determining which switch position 315 or 320 to transmit the baseline message data through, the baseline message can then be broadcast. If the output of the switch was determined to be through position 0 320, then the baseline message data can be broadcast through the inner antenna pair 205, or first pair of transmitters, with separation $D_0$. In this case, the outer pair 210 is not transmitting any data. Otherwise, if the output of the switch was determined to be through position 1 315, then the baseline message data can be broadcast through the outer antenna pair 210, or second pair of transmitters, with separation $D_1$. In this case, the inner pair 205 is not transmitting any data.

Figure 4:
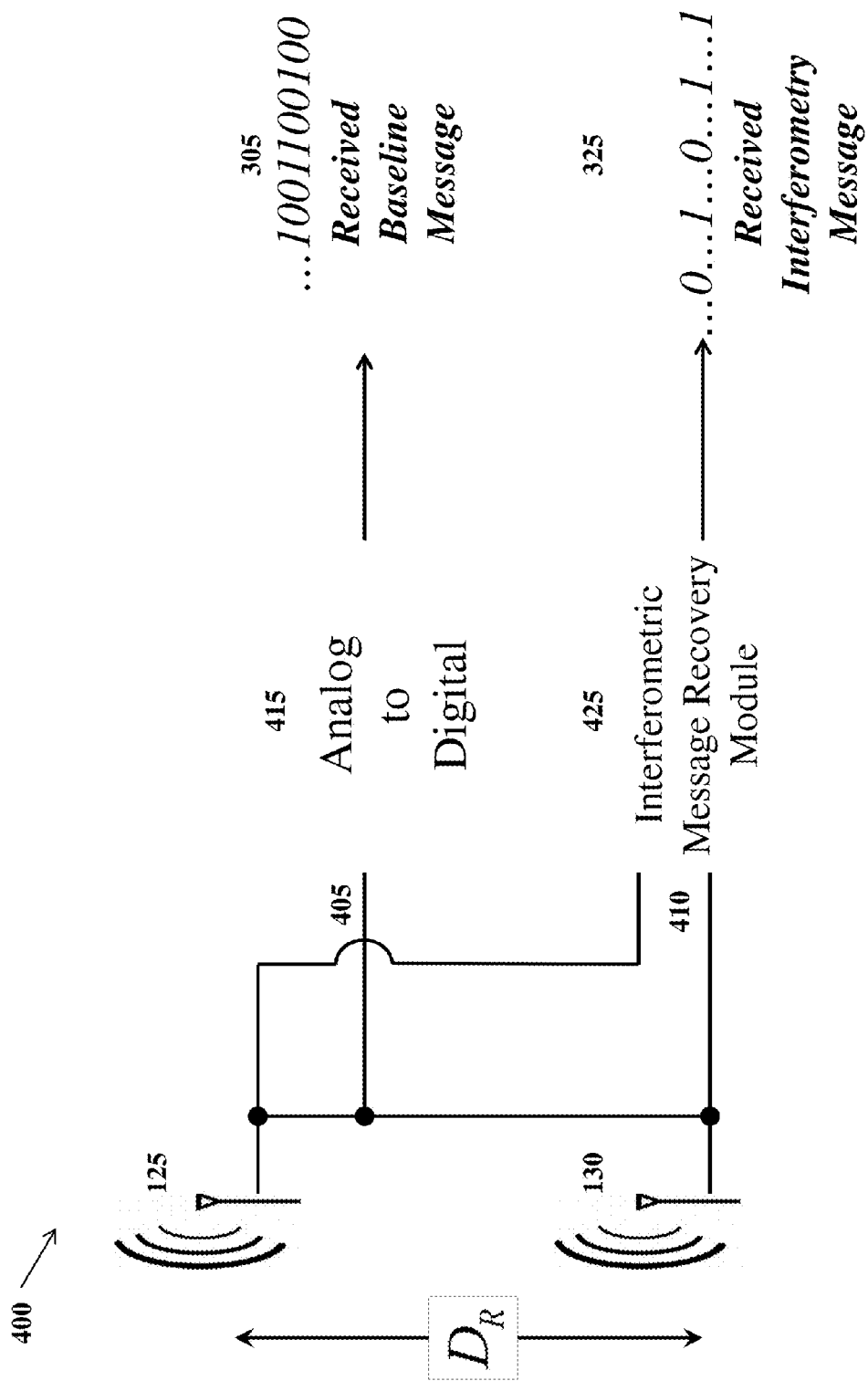
FIG. 4 is a diagram of a receiver operation, in accordance with an exemplary embodiment of the invention.

FIG. 4 is a diagram 400 of the receiver operation, in accordance with an exemplary embodiment of the invention. On the receiver side 110, one or more pairs of receivers (e.g., 125 and 130) can be configured to receive the broadcast data transmitted from the inner 205 and outer 210 antenna pairs. After receiving the broadcast data transmitted from the inner 205 and outer 210 antenna pairs, the output from the one or more pairs of receivers 125 and 130 can be processed in two branches: first branch 405 and second branch 410. In the first branch 405, the output of the pairs of receivers 125 and 130 can be combined and can go through a standard amplification and detection 415 of the pre-existing link, utilizing an amplifier and a detector as known to one of ordinary skill in the art. This combination of and amplification and detection process of the output of the branch 405 yields the received baseline message 305.

In the second branch 410, the output of each receiver 125 and 130 can be fed through an interferometric message recovery module 425. The interferometric message recovery module 425 can include a standard amplifier, a standard digital correlator, and a standard discriminator. One of ordinary skill in the art will understand that each of these components can be combined into a single piece of hardware or be separate pieces of hardware. One of ordinary skill in the art will also understand that the digital correlator and the discriminator can be programmed according to the requirements of the exemplary invention.

In an exemplary embodiment of the invention, the interferometric message recovery module 425 can recover the individual bits of the received interferometric message 325 in a multi-step method. First, the amplifier can amplify the electromagnetic field detected at each of the one or more pairs of receiver 125 and 130. Then, the intensity of the electromagnetic field at each of the one or more pairs of receiver 125 and 130 can be computed with a correlator. Secondly, with these computed intensities, the correlator can compute the reduced second-order correlation. The correlator can compute the reduced second-order correlation by first computing the second-order correlation defined in equation (2) between the individual intensities by averaging over a time $T_0$ the product of these intensities, and dividing this average by the product of the individual averages over a time $T_0$ of each intensity. Then, the value of the computed second-order correlation can be normalized to the interval [0, 1]. One of ordinary skill in the art will understand that the second-order correlation can be normalized to other intervals.

Finally, the value of the reduced second-order correlation can be compared to a predefined value of a bit-discrimination boundary. In an exemplary embodiment, the predefined value of a bit-discrimination boundary can be set at 0.5. One of ordinary skill in the art will recognize that other values can be used. Therefore, if the value of the reduced second-order correlation is larger than 0.5 the discriminator can output a 1 for the value of the bit. Otherwise, if the value of the reduced second-order correlation is less than 0.5 the discriminator can output a 0 for the value of the bit. Therefore, this method can recover each of the individual bits of the received interferometric message 325.

In an exemplary embodiment of the invention, the new type of channel has many potential benefits. For example, the new type of channel has a high potential for steganographic use based on the following factors. First, the messages sent through this channel piggyback on the open messages sent by each transmitter separately. Each transmitter can send pure noise and still a message can be sent through intensity interferometry. This requires duplicating the number of antennas in Single Input-Single Output systems and additional hardware for antenna switching. Therefore, in general, it is envisioned that the method can be used to send additional, low-priority data, or to send additional data steganographically.

Secondly, to detect a message, a potential eavesdropper would have to know both that intensity interferometry is being used, and know the transmission parameters (i.e., $D_S$, $D_R$, and L). The value of the second-order correlation can be a very quickly varying function of these parameters (see, e.g., FIGS. 5a and 5b representing how quickly γ changes). Finally, more than two pairs of transmitters and a pair of receivers can be used to exploit higher-order correlations; therefore, making the eavesdropping more difficult. The implementation of multi-detector interferometers and the use of higher-order correlations to measure the size and position of a source are a well-studied subject.

The use of intensity interferometry cannot be told by merely eavesdropping on the baseline transmission. Intensity interferometry can be used to communicate securely additional data within a wireless sensor network wherein power availability is at a premium.

Because of scarcity of resources, there is a conflict between the amount of data that the sensors can collect and the amount of data that can be communicated to the user. Therefore, a decision must be made as to the data to drop to avoid compromising the longevity of the sensors due to the extra power consumption. The use of intensity interferometry will require the fitting of sensors with duplicate antennas (each transmitting at half the original power), but, on the other hand, allow the transmission of additional data that otherwise is dropped.

Robustness against atmospheric disturbances is another example of the potential benefits of the invention. Atmospheric disturbances can be a hindrance when the information is sent by amplitude or phase modulation, or both, because of the phase lags introduced in the propagation path. Intensity interferometry relies on the measurement of the difference between phase differences averaged over a finite time interval; therefore, it is very robust against atmospheric disturbances.

Jamming is another example of the potential benefits of the invention. Traditional jamming methods will not work when utilized in an exemplary embodiment of the invention because they just add a background that intends to overwhelm the desired signal. However, intensity interferometry relies on measuring the correlations after background subtraction, see equation (6); therefore, it is immune to this type of jamming.

For successful jamming, random correlations need to be introduced, which is a task that seems very difficult. In addition, even if this last type of jamming is used, by using more than two detectors the geographic location of the transmitter can be pinpointed; therefore, signals from locations different from the expected one can be discarded.

Referring again to FIG. 1, a more technical and mathematical description of the invention will be described below. Consider now a 110 and b 115 to be sources of digital transmission over the air. For the sake of simplicity, assume that both antennas, or transmitters, 110 and 115 transmit using BPSK modulation, and therefore $$\delta(t) \in \{0, \pi\}, \quad (8)$$

This kind of transmission, i.e., the transmission by individual antennas, can be called the baseline transmission, and baseline symbols called $s_b$ can be the symbols thus sent.

In this case, and without any assumptions about the averaging time $T_0$, the reduced second order correlation calculated at the receivers can be $$\gamma = \cos^2(\Delta)\left(\frac{1 + \langle\cos\delta\rangle}{1 + \langle\cos\delta\rangle\cos\Delta}\right)^2 \quad (9)$$

where, as before, the sharp brackets indicate a time average over a time $T_0$. Note that the factor $\langle\cos\delta\rangle$ is dependent upon the averaging time $T_0$ when $T_0 \to \infty$ then $\langle\cos\delta\rangle \to 0$ and equation (7) can be recovered.

For a given distance L between the sources and the detectors, consider keeping $D_R$ fixed, while varying $D_S$. The different values of $D_S$ can result in different values of $\gamma$ at the receivers, and thus information can be sent.

To be specific, suppose it could be possible to change $D_S$ as a function of time, and that only two values of $D_S$ are allowed, $D_S=d_0$ and $D_S=d_1$. In other words, every $T_0$ seconds the transmitting baseline, $D_S$, can be changed between $D_S=d_0$ and $D_S=d_1$. Furthermore, suppose that these values are chosen such that the second-order correlation at the receivers is $\gamma(d_0)=0$, or $\gamma(d_1)=1$. Then, these two values of $\gamma$ can be used to represent the two values of a bit of information through intensity interferometry. Let us call interferometry symbols $s_i$ the symbols thus transmitted. Please note that it takes a time $T_0$ to transmit a single $s_i$ symbol.

FIG. 5(a) and FIG. 5(b) are contour plots of $\gamma$ depending on $D_S$, $D_R$, and L for a value of $\gamma=3$ cm, which corresponds to a frequency of 10 GHz, a value typical of wireless channels. Note that for maximal efficiency the value $\gamma=0.5$ can be utilized as the bit discrimination boundary (any other value would do as long as it permits to differentiate between the two values of $\gamma$). Therefore, any received value above 0.5 will be considered a one; otherwise, it will be considered as zero.

The novelty of this approach is that the additional information thus transmitted can be independent of what each of the transmitters is broadcasting. Even if the baseline broadcast consists of pure noise, information can be sent by letting $D_S$ vary between $d_0$ and $d_1$ every $T_0$ seconds.

The transmitters need not be moved mechanically. For example, if two pairs of transmitters are set up along a line perpendicular to the direction of the receivers such that the distance between the innermost pair is $D_0$ and the distance between the outermost pair is $D_1$, then an electronic switch can switch electronically between the outermost and innermost pair to transmit. For example, the inner transmitter pair can send a zero, and the outer pair can send a one. One of ordinary skill in the art will recognize that a similar type of method is used in Multiple-Input-Multiple-Output (MIMO) communication systems, wherein the power allocated to each transmitter can be varied according to the time-dependent attenuation of the multiple transmission paths. In an exemplary embodiment of this invention, MIMO technology can be utilized to effectively change electronically the pair of transmitting antennas.

In addition, the results in FIG. 5(b) show that this method of communication can be secure against eavesdropping. This follows from the rapid variation of $\gamma$ with $D_S$, $D_R$ and L. Indeed, by carefully choosing the separation between the source transmitters and the baseline of the receivers, the transmission can be targeted to a specific distance L. For values of L much smaller than this target distance, $\gamma$ varies so fast that an eavesdropper would need to know the value of $D_R$ with high accuracy. On the other hand, at distances much larger than L, $\gamma$ does not change, and therefore no information is available at these distances. In addition, by using modulation schemes more sophisticated than $\gamma \in \{0, 1\}$, eavesdropping can be made more difficult.

Finally, it is important to stress that this method of communication does not require additional bandwidth or additional frequencies because it relies on the variation of spatial correlations between the electromagnetic fields. Thus, the data throughput of existing wireless links can be enhanced in an already crowded electromagnetic spectrum.

To determine the effectiveness of the exemplary embodiment of the invention, it is useful to see how much information may be passed via the exemplary method described herein. As any wireless method, it is subject to two main sources of error: electronic noise that appears in the form of additive noise, and atmospheric fading. In addition, the method can be subject to the error introduced through the signaling time $T_0$ used (recall that every $T_0$ seconds we switch transmitter pairs to transmit a different $s_i$ symbol).

In an exemplary embodiment of the invention, the method can be used as an addition to an existing wireless channel used to transmit the $s_b$ symbols. Because any electronic noise or atmospheric fading are already accounted for in the baseline channel design, their impact on the interferometric channel is likely to be minimized further because the method relies on the time average over several $s_b$ symbols to send a $s_i$ symbol. Therefore, a choice was made to concentrate on the role of the time average that is intrinsic to the method, and consider how capacity depends on $T_0$, and whether any information may be passed for finite T.

As explained above, the distance $D_R$ between the receivers is fixed, and the distance between transmitters $D_S$ between two values, $d_0$ and $d_1$ every $T_0$ seconds is varied. Let $\gamma_S$ be the value of the second-order correlation thus sent, i.e., this is the ideal value sent (and received) in the absence of time averaging errors:

$$\gamma_S = \cos^2(\Delta), \tag{10}$$

where $\Delta$ may take the values $\Delta_0$ and $\Delta_1$ depending on whether $D_S = d_0$ or $D_S = d_1$. When $T_0$ is finite, the computed value at the receivers, $\gamma_R$, is $$\gamma_R = \gamma_S \left( \frac{1+X}{1+X\sqrt{\gamma_S}} \right)^2 \tag{11}$$

where for the sake of compactness we have written $$X \triangleq \langle \cos \delta \rangle. \tag{12}$$

Note that if transmitting antennas were placed exactly at the values of $D_S$ required to get $\Delta_0 = \pi/2$ and $\Delta_1 = 2\pi$ (these values are chosen for maximal efficiency, but any other value that yield two values of $\gamma$ that can be discriminated will do), then $\gamma_S(\Delta_0)=0$ and $\gamma_S(\Delta_1)=1$ and $\gamma_R = \gamma_S$ identically for any value of the averaging time $T_0$. Therefore, in the ideal case of perfectly placed antennas the error probability is zero.

Practically, however, errors in the values of $d_0$ and $d_1$ will make $\gamma_S \neq 0, 1$, and the time averaging procedure will introduce errors at the receiving end. Let $\gamma_0 \triangleq \gamma_S(\Delta_0)$ and $\gamma_1 \triangleq \gamma_S(\Delta_1)$ be the values of $\gamma_S$ obtained when placement errors occur. It is straightforward, but lengthy, to show that when $\gamma_0 < 0.33$ then $\gamma_R(\gamma_0) < 0.5$ for any averaging interval, i.e., subject to this bound on $\gamma_0$ transmitted zeros are recovered without any error. The same is not true for $\gamma_1$ for any finite averaging value errors are introduced. Therefore, if the placement errors when transmitting a zero are not too large ($\gamma_0 < 0.33$ means that $d_0$ is accurate to within 20%, a very loose tolerance), then our channel is a Z-channel.

What is the capacity of this Z-channel? It depends on the probability of $\gamma_R(\gamma_1) < 0.5$, which depends, through equations 11 and 12, on the averaging time used.

Because the baseline transmission is digital, averaging over $T_0$ means that averaging over N $s_b$ symbols of duration $T_B$ each, i.e., $$T_0 = NT_B \tag{13}$$

Thus, if the average over N $s_b$ symbols is taken, and for k of them $\delta = \pi$ while N−k have $\delta = 0$, then $$X = \frac{N-2k}{N}. \tag{14}$$

Because $s_b$ symbols with $\delta=0$ and $\delta=\pi$ occur with equal probability, then k, and therefore X, follow a binomial distribution with probability p=0.5, and the probability of getting a given value of X is $$P\left(X = \frac{N-2k}{N}\right) = 2^{-N} \binom{N}{k}. \tag{15}$$

According to equation (15) the expectation value of X is E(X)=0.

For a given $\gamma_S = \gamma_1$ equations (11), (12), and (14-15) can be used to compute the probability of error for a $s_i=1$ symbol as a function of the number of $s_b$ symbols averaged. For example, when sending $s_i=1$ for two cases: first, when the placement of the antennas is accurate to within 10%, i.e., $\Delta_1=1.8\pi$ and therefore $\sqrt{\gamma_S}=\sqrt{\gamma_1}=0.809$ (instead of the ideal value $\gamma_1=1$), and when $\Delta_1=1.9\pi$ (5% placement error, $\sqrt{\gamma_S}=\sqrt{\gamma_1}=0.951$).

Armed with the error probability P, the capacity of the interferometric channel $C_i$ can be computed:

$$C_i(P) = \frac{C_Z(P)}{NT_B}, \tag{16}$$

where $$C_Z(P) = \log_2\left(1 + (1-P)P^{\left[\frac{P}{1-P}\right]}\right)$$

is the capacity for a Z-channel. Note that in equation (16), $C_Z(P)$ must be divided by $NT_B$ because this is the time it takes to send a $s_i$ symbol. It should be noted that as $P \to 0$ then $C_Z \to 1$, and, therefore, $C_i T_B \to 1/N$.

At first glance, it seems that the best strategy to increase capacity would be to use the smallest N possible. This is true, but it does not take into account the coding difficulties. As the probability of error decreases, one can basically ignore error-correction coding and just send the raw symbols, and take an error every now and then. Therefore, instead of sending one $s_i$ symbol every two $s_b$ symbols (N=2) and use error-correction coding to overcome the high error probability (P=0.25) and achieve $C_i \approx 0.35/T_B$, it is better to use, say, N=16 for which P=$3 \times 10^{-2}$ or P=$1.8 \times 10^{-4}$ (depending on the antenna placement error) and send the raw symbols, achieving $C_i \approx 0.06/T_B$.

In summary, up to now, intensity interferometry has been primarily used to measure the angular size of the source $D_S/L$ by varying the distance between receivers $D_R$. Because the second-order correlation C is unchanged upon permutation of $D_S$ and $D_R$, the exemplary embodiment of this invention exploits this symmetry to create a communication channel. The communication channel operates by keeping $D_R$ fixed, while varying $D_S$. The different values of $D_S$ will result in different values of $\gamma$ at the receivers, and thus information can be sent.

If $D_S$ is varied as a function of time between two values $d_0$ and $d_1$ such that $\gamma \in [0,1]$, these values can be used to represent the two values of a bit of information. The novelty of this approach is that the additional information thus transmitted is independent of what each of the transmitters is broadcasting. Even if the broadcast consists of pure noise, information can be sent by varying $D_S$.

The transmitters need not be moved mechanically: setting up four transmitters, the invention can allow alternating electronically between the outermost and innermost pair of transmitters to transmit. For this scheme to work it is critical that the radiation emitted by the transmitters be non-coherent. However, this is not a difficulty because modern communications rely on modulating the amplitude or phase of a carrier with sinusoidal frequency $\omega_0$. The modulating amplitude and phase are random time sequences; therefore, the radiation from digital communication sources is incoherent on timescales longer than the symbol duration $T_B$. In other words, as long as the intensities are averaged over times $T_0 \gg T_B$ (if the transmitters are broadcasting pure noise, then $T_B$ is the typical coherence time of the radiation).

Overall, this exemplary embodiment of the invention is capable of sending additional information in a novel manner, using intensity interferometry, over a pre-existing free-space communication channel at radio, or other electromagnetic, frequencies without increasing the used bandwidth. Intensity interferometry can be used to send this additional information in a way that is robust against atmospheric disturbance; robust against jamming; and the information is sent steganographically, i.e., a casual eavesdropper would not be able to tell that there is additional information being sent over the pre-existing communication channel.

Portions of the invention can comprise a computer program that embodies the functions described herein. For example, the switch, interferometric message recovery module, which includes the correlator and discriminator, can be programmable. Furthermore, any modules described herein can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the figures and associated description in the application text. Therefore, disclosure of a particular set of program code instructions is not considered necessary for an adequate understanding of how to make and use the invention.

It should be understood that the foregoing relates only to illustrative embodiments of the present invention, and that numerous changes may be made therein without departing from the scope and spirit of the invention as defined by the following claims.

The invention claimed is:

1. A method for encoding and transmitting information using intensity interferometry; comprising steps of:
    receiving a message to be transmitted via intensity interferometry, wherein the message comprises a plurality of bits;
    wherein for each of the plurality of bits of the received message to be transmitted via intensity interferometry, choosing a relative transmitter spacing depending upon a bit value of the message;
    sending a baseline message, for each bit in the received message to be transmitted via intensity interferometry, to a pair of transmitters having a first transmitter spacing or to a pair of transmitters having a second transmitter spacing greater than the first transmitter spacing depending upon the relative transmitter spacing chosen for each respective bit value of the message; and
    transmitting the baseline message via the respective pair of transmitters.

2. The method of claim 1, further comprising steps of:
    feeding the baseline message to be transmitted using a standard method of wireless communication to a digital switch,
    wherein the baseline message comprises a plurality of bits;
    wherein choosing a relative transmitter spacing includes setting the digital switch depending upon a corresponding bit value of the message to be transmitted via intensity interferometry, and
    wherein transmitting includes broadcasting a fixed number $N_b$ of bits of the baseline message through the pair of transmitters having the first transmitter spacing or the pair of transmitters having the second transmitter spacing depending upon the position of the digital switch, wherein $N_b$ is greater than 1.

3. The method of claim 2, further comprising a step of modulating and amplifying each of the plurality of bits of the baseline message before broadcasting the bits through the pairs of transmitters.

4. The method of claim 2, wherein the step of setting the digital switch to an output position depending upon the bit value of the message to be transmitted via intensity interferometry, comprises steps of:
    setting the digital switch to a first position when the bit of the message to be transmitted via intensity interferometry has a value of zero; and
    setting the digital switch to a second position when the bit of the message to be transmitted via intensity interferometry has a value of one.

5. The method of claim 2, wherein the step of transmitting the baseline message comprises steps of:
    serially broadcasting the bits of the baseline message through the first pair of transmitters when the digital switch is in the first position; and
    serially broadcasting the bits of the baseline message through the second pair of transmitters when the digital switch is in the second position.

6. The method of claim 2, wherein the step of transmitting the baseline message, comprises a step of utilizing more than two pairs of transmitters for broadcasting.

7. The method of claim 2,
    wherein the step of transmitting includes broadcasting a single bit of the message to be transmitted via intensity interferometry for a time To,
    wherein the step of transmitting includes broadcasting a single bit of the baseline message for a time TB, and wherein $T_0 \gg T_B$.

8. The method of claim 2, further comprising steps of:
    receiving the baseline message at one or more pairs of receivers; and
    recovering a received interferometric message after receiving the baseline message at the one or more pairs of receivers.

9. The method of claim 8, further comprising a step of recovering the baseline message after receiving the broadcast of the plurality of bits of the baseline message at the one or more pairs of receivers.

10. The method of claim 9, wherein the step of recovering the baseline message after receiving the broadcast of the plurality of bits of the baseline message at the one or more pairs of receivers comprises steps of:
    combining the plurality of bits of the baseline message received at the one or more pairs of receivers; and processing the combined plurality of bits in a standard amplification and detection process to generate the baseline message.

11. The method of claim 8, wherein the step of recovering the received message to be transmitted via intensity interferometry after receiving the broadcast of the plurality of bits of the baseline message at the one or more pairs of receivers, comprises steps of:

feeding the output of the one or more pairs of receivers into an amplifier, a digital correlator, and a discriminator;

amplifying an electromagnetic field detected at each of the one or more pairs receivers;

computing an instantaneous intensity of the electromagnetic field sensed at each of the one or more pairs receivers;

computing reduced second-order correlations with the correlator and the detected instantaneous intensities, where averages are computed over time $T_0$ taken to transmit $N_b$ bits of the baseline message, thus obtaining a time series of reduced second-order correlations, with the total number of reduced second-order correlations in the series equal to the number of bits of the message to be transmitted through intensity interferometry;

normalizing each of the reduced second-order correlations; and recovering the individual bits of the message to be transmitted via intensity interferometry based on comparing each of the values in the time series of the normalized reduced second-order correlations with a bit-discrimination boundary.

12. The method of claim 11, wherein the step of recovering the message to be transmitted via intensity interferometry based on the value of the reduced second-order correlation and a bit discrimination boundary, comprises steps of:

outputting a 1 for the value of the bit with the discriminator if the value of the reduced second-order correlation is larger than the bit discrimination boundary; and outputting a 0 for the value of the bit with the discriminator if the value of the reduced second-order correlation is less than the bit discrimination boundary.

13. The method of claim 1, wherein the step of choosing a relative transmitter spacing comprises, for each of the plurality of bits of the received message to be transmitted via intensity interferometry, choosing a pair of transmitters out of two or more pairs of transmitters, each pair of transmitters being separated by a different fixed distance, depending upon the bit value of the message.

14. An interferometric communication receiver system, comprising:

one or more pairs of receivers configured to receive a broadcast of a plurality of bits of a baseline message; and an interferometric message recovery module configured to recover bits of the received interferometric message after receiving the broadcast of the plurality of bits of the baseline message at the one or more pairs of receivers, the interferometric message recovery module including:

a correlator configured to compute the intensity of the electromagnetic field received at each of the one or more pairs receivers; compute a reduced second-order intensity correlation based on the computed intensities; and normalize the reduced second-order intensity correlation value, and a discriminator configured to output each value of the individual bits of the interferometric message based on comparing a corresponding value of the normalized reduced second-order intensity correlation with a bit discrimination boundary.

15. A method of receiving an encoded interferometric message comprising steps of:

receiving a broadcast signal at one or more pairs of receivers;

computing an instantaneous intensity of the electromagnetic field sensed at each of the one or more pairs receivers;

computing a reduced second-order intensity correlation with a correlator based on the computed instantaneous intensities;

normalizing the reduced second-order intensity correlation; and recovering each individual bit of the encoded interferometric message based on comparing a corresponding value of the normalized reduced second-order intensity correlation with a bit-discrimination boundary.

* * * * *